United States Patent [19]

Ohashi et al.

[11] 4,028,713
[45] June 7, 1977

[54] DATA RECORDING CAMERA

[75] Inventors: Saichiro Ohashi, Kyoto; Susumu Fujita, Kobe, both of Japan

[73] Assignee: Fuji Photo Film Co., Ltd., Minami-ashigara, Japan

[22] Filed: June 2, 1976

[21] Appl. No.: 692,073

[30] Foreign Application Priority Data

June 3, 1975 Japan .............................. 50-67208
June 3, 1975 Japan .............................. 50-67209

[52] U.S. Cl. ............................... 354/106; 354/225
[51] Int. Cl.² ........................................ G03B 17/24
[58] Field of Search .................. 354/105–109, 354/224, 225, 166, 219, 53, 54

[56] References Cited

UNITED STATES PATENTS

| 3,590,703 | 7/1971 | Ono .................................... 354/106 |
| 3,703,129 | 11/1972 | Goshima et al. .................. 354/106 |
| 3,765,754 | 10/1973 | Winkler .......................... 354/105 X |
| 3,952,319 | 4/1976 | Hirata et al. ....................... 354/109 |

FOREIGN PATENTS OR APPLICATIONS 453,011 11/1927 Germany .......................... 354/109

Primary Examiner—John Gonzales
Attorney, Agent, or Firm—Sughrue, Rothwell, Mion, Zinn & Macpeak

[57] ABSTRACT

Data recording camera permitting prior confirmation that data recorded simultaneously with taking of a photograph is accurate and is in a correct position relative to a photographed scene. A data specification means which is provided inside the camera and is movable to different settings by externally actuable means comprises one or more rotatable disks, each of which has identical data marked on diametrically opposite peripheral portions thereof. For any given setting, a data value on one side of a disk is in position to produce a latent image on film material, and the identical value on the opposite side of the disk is so positioned that an image thereof may be projected to the camera viewfinder where it is viewable by the photographer.

5 Claims, 4 Drawing Figures

DATA RECORDING CAMERA

BACKGROUND OF THE INVENTION

FIELD OF THE INVENTION

The present invention relates to a data recording camera. More particularly the invention relates to a data recording camera in which the date or other data may be selectively recorded on film material simultaneously with exposure of the film material to imagewise light reflected from a scene to be photographed, and in which prior to taking of a photograph the correctness of and position of such recorded data relative to a subsequently produced image of a scene may be determined by a photographer by observation through the camera veiwfinder.

There are known various types of camera which permit recording of a serial number, the date, or other data in association with each photograph produced, such data being generally produced in an unobtrusive portion of a photograph, for example in a lower corner portion of a finished print. When data to be recorded is the date, for example, several photographs may be taken on the same day, or successive photographs may be taken on different days, and therefore, rather than have the setting of data recording means changed simultaneously with advance of film in the camera, as is the case when photographs are required to be numbered serially, for example, it is necessary to provide externally actuable setting means for moving data specification means inside the camera to indicate different dates. In this case, in conventional cameras there has been the disadvantage that it has not been possible for a photographer to confirm that the externally actuable setting means has accurately moved the data specification means to a correct setting. Similarly, after use of a camera for a certain time, because the data specification means, being mechanically actuated, may fail to be moved after use of the camera for a comparatively long time to different settings, data may be recorded not in unobtrusive portions of photographs, but in portions in which photographs are spoiled by the data, and with a conventional camera it has not been possible to confirm that data will be recorded in a requisite portion of a photograph, with the result that, since the photographer is not made aware of any fault of the data specification means until completion of exposure of the entirety of at least one roll of film and of subsequent processing of exposed film, many photographs may be have incorrect data recorded thereon or may be spoiled by having data obtrusively recorded thereon. Also, for all kinds of data, it may sometimes be required not to record data for a particular photograph, but to use the entirety of a film frame for photographing a scene, in other words it is desirable that it be possible to selectively effect recording of data. With conventional data-recording camera making it possible to selectively record data has generally required complex construction.

It is accordingly a principal object of the present invention to provide a data recording camera in which a photographer may confirm that value and position of subsequently recorded data are correct during the normal process of observing a scene to be photographed through the camera viewfinder.

It is another object of the invention to provide a data recording camera which permits selective recording or non-recording of data together with photographs.

It is a further object of the invention to provide a data recording camera having a compact construction.

In accomplishing these and other objects there is provided according to the present invention a data recording camera including a data specification means which is provided inside the camera, is movable to different settings by externally actuation means and which is constituted by one or more rotatable disks each of which has items numerical or other data marked on a peripheral portion thereof, identical items of data being marked on diametically opposed portions of the disk periphery. When a disk is moved to a particular setting, the corresponding data value on one side of the disk is in a position such that upon actuation of an independent light source simultaneously with opening of the camera shutter to expose a film frame, a latent image of the data value is recorded on the film frame, and the identical data value on the diametrically opposite peripheral portion of the disk is so located that the image thereof may be directed to the camera viewfinder system, where it may be viewed by the photographer, the position of this image relative to a frame defined in the viewfinder system and indicative of a photographic area being the same as that of the produceable image of the data value to the film frame, whereby the photographer may confirm, prior to taking a photograph, that data will be recorded in a required portion of the photograph, and may also verify that recorded data is of a requisite value. The independent light source is actuated when the camera shutter is actuated on condition that an external control switch is switched on. This switch is switched off when it is determined that for example because of malfunction of the data specification means or setting means, recorded data will not be in a suitable position relative to a photograph, or when, for artistic or other reasons, it is not required to record data for a particular photograph.

A better understanding of the present invention may be had from the following full description of several preferred embodiments thereof when read in reference to the attached drawings in which like numbers refer to like parts, and FIG. 1 is a cross-sectional view showing layout of main portions of a data recording camera according to one embodiment of the invention;

Figure 1:
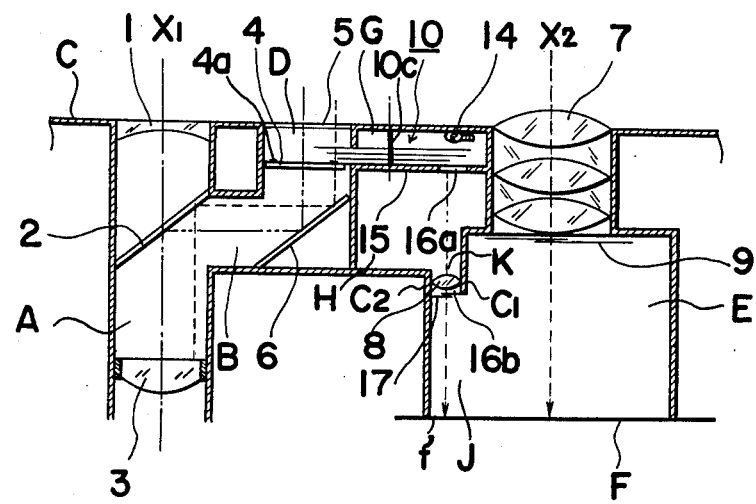

Referring to FIG. 1, in which the upper part of the drawing is the front of a camera, there is shown a camera C comprising a viewfinder system including a viewlens 1 which is provided at the forward end of a viewfinder compartment A provided in front to rear alignment in the camera and has an optical axis coincident with that of and a focal plane parallel to that of an eyelens 3 provided at the rear of the viewfinder compartment, a scene to be photographed being viewable from the eyelens 3 by a photographer looking through the view-lens 1. Between the lenses 1 and 3, in a generally central portion of the viewfinder compartment A, there is provided a half-mirror 2, which extends across the viewfinder compartment A and is inclined at an angle of 45° to the optical axis X1 of lenses 1 and 3, the half-mirror 2 being inclined away from the view-lens 1, and the rear surface of the half-mirror 2 being able to receive light directed along a passage B which is disposed in a left to right line with respect to the camera C and has one end communicating with the viewfinder compartment A. The opposite end portion of the passage B is common to the rear end portion of a passage D which leads to the front of the camera C. At the front end of the passage D, i.e., generally level with the front wall of the camera C, there is provided a so-called dormer window 5, which admits external light into the passage D. This light passes through a transparent plate 4 provided in left to right alignment across a forward portion of the passage D, and impinges on a full reflection mirror 6 which is provided in the rear-end portion of the passage D and is provided level with and parallel to the half-mirror 2. The light is reflected by the mirror 6 onto the rear surface of the half-mirror 2 and by the half-mirror 2 to the eyelens 3. The transparent plate 4 is level with the focal plane of the eyelens 3 and has applied thereon, by plating or similar process, a square or rectangular frame 4a, which defines the field of a photographable scene, this frame 4a being viewable through the eyelens 3 because of reflection by the mirrors 6 and 2. Thus, the elements 1 through 6 constitute a so-called dormer window type viewfinder, and the photographer may view a scene to be photographed against the frame 4a by observation through the eyelens 3, which effects suitable magnification of the scene and frame 4a.

Still in FIG. 1, the film exposure system of the camera comprises a lens system 7 which is provided in a forward portion of the camera, has an optical axis X2 parallel to that of the view-lens 1 and eyelens 3, and may focus the image of a scene to be photographed on a film frame F currently at an exposure station at the rear of an exposure compartment E defined to the rear of the lens system 7 by internal walls 8 of the camera C, exposure of a film frame F being effected upon actuation of a shutter button, not shown, to open a normally-closed shutter 9 which is provided immediately behind the lens system 7, at the front of the exposure compartment E.

The exposure compartment E is separated from the above mentioned passage D by internal camera walls 15, which define a forward lightproof compartment G, which is forward of the line of the frame-defining plate 4, and a rear lightproof compartment H, which is generally in line with the forward end portion of the exposure compartment E, the right-hand portion, as seen in the drawing, both of the forward compartment G and of the rear compartment H being in line with an extension portion J of the exposure compartment E. When a film frame F is currently at the exposure staion, a photosensitive film portion f′ which is outside in a corner but immediately adjacent to the area of the film frame F, i.e., a film portion which corresponds to a border portion in a completed print lies in the exposure compartment extension portion J. An opening 16a is defined in the internal camera wall 15 which separates the forward light proof compartment G and the rear lightproof compartment H, the opening 16a is in line with an opening 16b which is defined in the front portion of the exposure compartment extension portion E between a left side wall of the exposure compartment portion E and a right side wall of the rear lightproof compartment H, and in which there is positioned a focussing lens 8 and a normally-closed auxiliary shutter 17 which is provided immediately behind the lens 8 and is opened in coincidence with the opening of the shutter 9 upon actuation of the shutter button. Both openings 16a and 16b are in line with the photosensitive film portion f′ in the exposure compartment extension 8a.

Figure 2:
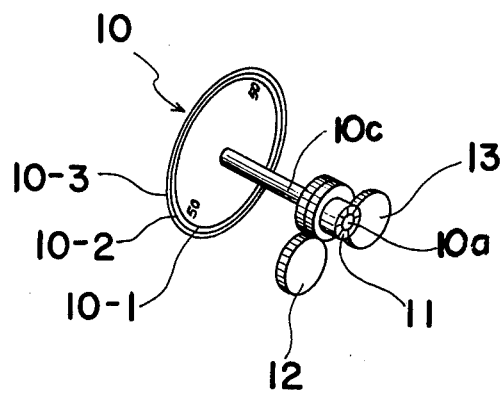
FIG. 2 is a perspective view of a data specification means and setting means according to the invention.

Referring to FIGS. 1 and 2, in the forward compartment G there is provided a data specification means 10 which includes disks 10-1, 10-2, and 10-3 which have successively larger diameters, are disposed parallel to one another and to the front wall of the camera, and are fixedly mounted on a coaxial independently rotatable shafts 10a, 10b, 10c, respectively.

All the disks 10-1, 10-2, and 10-3 are sufficiently large in diameter to extend from above the opening 16a to a short distance within the passage D, in front of the transparent plate 4.

Along the peripheral portion of one half of each disk 10-1, 10-2, and 10-3 there is defined a series of numbers, letters, words, or other items of data, and the same series of data items is defined along the peripheral portion of the disk, identical items of data being defined on diametrically opposed portions of each disk. The data items defined on the largest diameter disk 10-3 are located on a peripheral portion thereon which is not covered by or in line with any portion of the next largest diameter disk 10-2, and the peripheral data-carrying portions of the disk 10-2 similarly stand clear of the smallest diameter disk 10-1. Also, preferably the portions of the disks 10-3 and 10-2 immediately adjacent to the peripheral data-carrying portions thereof define web structures, whereby the data-carrying portions of disk 10-1 are in line with open portions of disks 10-2 and 10-3, and the data-carrying portions of disk 10-2 also are in line with open portions of disk 10-3.

At any angular position of any of the disks 10-1, 10-2, or 10-3, the peripheral portion thereof which extends over the opening 16a or into the passage D is large enough to carry one item of data only. Similarly at any one setting only one item of data carried by each of the disks 10-1, 10-2, and 10-3 can be present in the passage D. Disk portions extending over the opening 16a are described below as being at the data projection position, and disk portions extending into the passage D as being at the data reflection position. Light entering the dormer window 5 causes the image of data content at the reflection position to be carried through the transparent plate 4, to the mirror 6, to the mirror 2, and to the eyelens 3. By observation through the eyelens 3, therefore, the photographer may determine the position of this data content relative to the frame 4a defined on the plate 4 and may also know what this data content is, i.e., since the disks 10-1, 10-2, and 10-3 are made of rigid material and identical data items are symmetrically disposed on opposite peripheral portions thereof, the photographer may know what data content at the data projection position is.

If the data required to be recorded on photographs is the date, the series of data items on opposite side peripheral portions of the smallest-diameter disk 10-1 is suitably the series of numbers "1" to "31", to represent the day of the month, the series on the next larger diameter disk 10-2 is the series of numbers "1" to "12", to represent months, and the series on the largest-diameter disk 10-3 is the series of numbers "75" to "85", for example to represent the years 1975 to 1985.

The disks 10-1, 10-2, and 10-3 may be independently turned to required angular positions by rotation of externally actuable knobs 11, 12, and 13, respectively, which control rotation of the shafts on which the respective disks are mounted. Thus, disk 10-3, for example, may be turned number "75" carried on one peripheral portion thereof is brought to the data projection position and the number "75" carried on the diametrically opposite peripheral portion thereof is brought to the data reflection position, other numbers carried by the disk 10-3 being within the forward lightproof compartment G, and the disks 10-1 and 10-2 being similarly movable to set positions.

The forward lightproof compartment G also accommodates a point light source 14, which is positioned forward of the data specification means 10 and in line with the openings 16a and 16b, and which, on condition that an externally actuable control switch, not shown, is switched on, is actuated momentarily each time the shutter 9 is opened to expose a film frame F to image-wise light directed to the exposure station by the lens system 7, whereby film portion f' in the exposure compartment extension J is exposed to image-wise light coming from data at the date projection position through the auxiliary shutter 17, this light being focussed on the film portion f' by the lens 22. It is to be noted that illumination of data items at the data projection position may be constant and is independent of brightness of a photographed scene, whereby data may be always be clearly recorded on a completed print.

Thus, with the camera of the invention, in the normal process of selecting position of the camera as a whole while looking at a scene to be photographed through the viewfinder, the photographer may simultaneously verify that data content specified by the data specification means 10 is the requisite content, and make adjustment by means of the control knobs 11 through 13 as required. Having positioned the camera to photograph the required scene, the photographer actuates the shutter button to produce a latent image of the scene on the film frame F and a latent image of the data content specified by the means 10 on the film portion f'. With this embodiment of the invention, even supposing the data specification means 10 is displaced from a requisite position, data is not recorded on a film frame F for carrying the photographic image of a scene, since the image of the data specification means 10 is restricted by the openings 16a and 16b and lens 8 to appearing on the film portion f', which in a completed print is external to the film frame F. This is of particular advantage when the photographer takes a rapid-action shot, and does not have time to check content and position of data specified by the means 10. In other situations, if there is such displacement of the data specification means 10, the photographer is made aware of the displacement upon observation through the eyelens 3, and may therefore take action such as switching off the control switch of the light source 14 and subsequently, after exposure of the entire roll of film, identifying the roll in a suitable manner. Also of course, if it is not required to record the date together with photographs, or if for artistic reasons it is required to produce a photograph with a plain border, it is simply necessary to switch off the control switch of the light source 14.

The focussing effect of the lens 8 is normally effective in preventing light emitted by the light source 14 from impringing on any part of film material other than on the film portion f'. However, needless to say, instead of a simple opening 16b defined between internal camera walls 8 and 15 such as shown in FIG. 1, walls C1 and C2 may define a comparatively long passage K which extends rearwardly to the immediate vicinity of the film portion f', thereby further ensuring prevention of unrequired exposure of the film frame F due to scattering in the emposure compartment of light emitted by the light source 14.

Since data is recorded on a white border of a completed print, the data items on the disks 10-1, 10-2, and 10-3 are suitably marked in black, for example, on a transparent surface, although the principles of the invention are unchanged if recorded data on a completed print is required to be white and data items are defined as punch-outs in the disks 10-1, 10-2 and 10-3.

Figure 3:
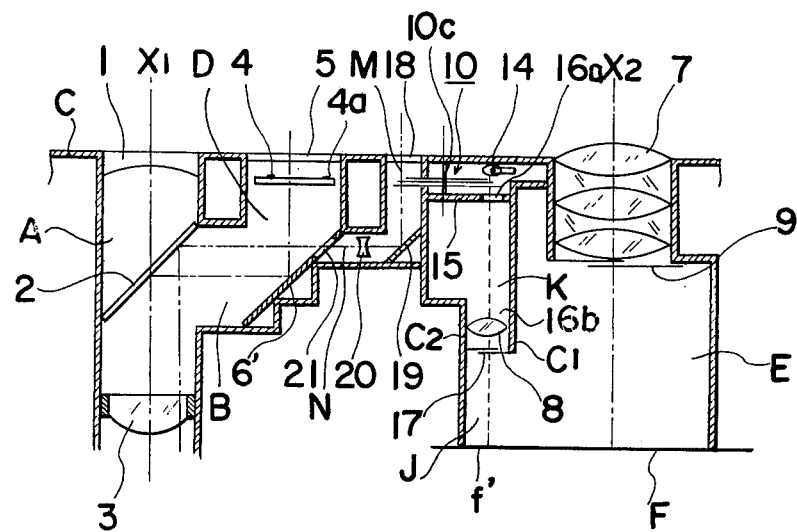
FIG. 3 is a cross-sectional view showing layout of main portion of a data recording camera according to another embodiment of the invention.

Referring now to FIG. 3, there is shown an embodiment of the invention according to which the data reflection position is separate from the viewfinder system. In this embodiment the left-hand edge portion of the data specification means 10 extends into a passage M, which extends rearwardly from a dormer window 18 mounted in the front wall of the camera C and is separate from, adjacent to and parallel to the passage D. The rear end of the passage M connects to one end of a passage N which is in left-to-right alignment and is level with a generally forward portion of a full-reflection mirror 6' having a small transparent portion 21 defined therein in line with a generally central portion of the passage N, the main, reflecting area of the mirror 6' serving to reflect the image of the frame 4a to the mirror 2. The image of data items located at the data reflection position and illuminated by light entering the dormer window 18 is directed along the passage M, through the transparent portion 21 of the mirror 6', and onto the rear surface of the half-mirror 2 by a full-reflection mirror 19 which is provided at the rear end of the passage M. This construction has the advantages that there is greater freedom in selecting the mounting position of the data specification means 10, and that all the light entering the dormer window 5 of the viewfinder system is allowed to reach the eyelens 3.

Depending on factors such as the position of the data specification means 10 relative to the focal plane of the eyelens 3, there may be provided a compensating lens 20 in the passage N. Also, by provision of the auxiliary shutter means 17 which is located immediately to the rear of the lens 8, and is opened for a short time during or after actuation of the main shutter means 9, it is permitted for the light source 14 to be actuated for a comparatively long time upon exposure of each film frame F, and control circuit means for making actuation time of the light source 14 very short may be dispensed with.

Figure 4:
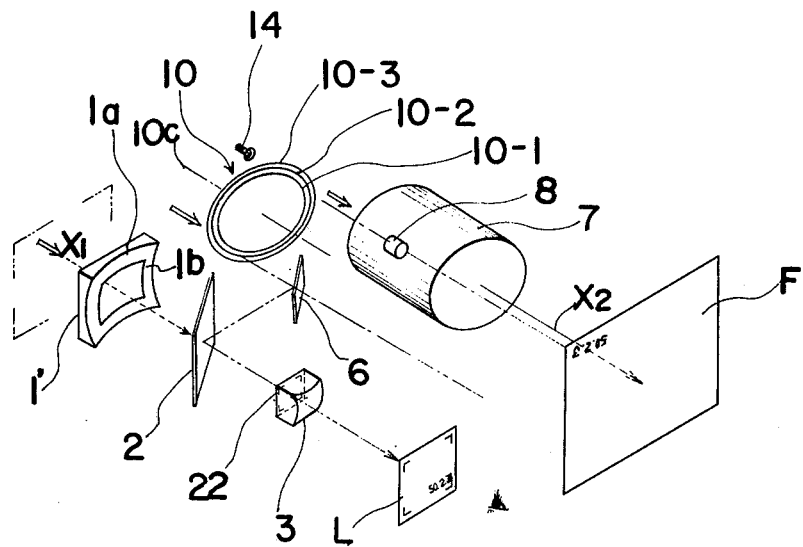
FIG. 4 is a perspective view showing disposition of main portions of a data recording camera according to another embodiment of the invention.

Reference is now had to FIG. 4 which shows an embodiment of the invention employing a silvered viewfinder in which the view-lens 1' is constituted by a plano-concave lens whose concave surface 1a is inward with respect to the camera and has applied thereon a border 1b of reflective material to constitute a frame defining a photographable area. Light entering the viewfinder system via the transparent portion of the lens 1' passes through a half-mirror 2 inclined at an angle of 45° to the optical axis X1 of the lens 1', to an eyelens 3 which is provided at the opposite end of the viewfinder system, and is constituted by a plano-convex lens whose convex surface is outward with respect to the camera C, on whose plane surface is defined a frame 22, and which serves to suitably magnify viewed scenes and the frame defining the photographable area. The image of data items at the data reflection position, which is exterior to the viewfinder system and is illuminated by light entering a passage M such as described above is directed by a mirror 6 to the rear surface of the half-mirror 2 and thence to the eyelens 3, in which it appears in a corner portion of the area defined by the frame 22, and upon actuation of the light source 14, which is effected upon actuation of shutter means included in the camera exposure system and is terminated rapidly by control means not shown, the image of identical data items is directed onto a corner portion of a film frame F currently at the exposure station by a supplementary lens 8, the image of a scene to be photographed being focussed on the film frame F by the lens system 7.

In this embodiment also actuation of the light source 14 is suitably dependent on an external control switch being switched on, in order to permit recording of data on photographs to be effected selectively. To permit accurate assessment of the effect on composition, etc. of recordable data on a scene to be photographed the ratio of degree of magnification of the eyelens 3 to that of the supplementary lens 8 is suitably made proportional to the ratio of actual size of the frame 22 defined on the lens 3 to that of a film frame F.

What is claimed is:

1. In a camera including an exposure system comprising a main focussing lens system and associated main shutter means actuable to effect exposure of film material at an exposure station to image-wise light reflected from a scene to be photographed and a viewfinder system to permit viewing of a scene to be photographed, the improvement comprising:
    data specification means including at least one identical item of data;
    externally actuable setting means actuable to move said data specification means to different settings in each of which an item of data is brought to a data projection position and a data reflection position;
    optical means actuable simultaneously with actuation of said main shutter means to focus the image of a data item located at said data projection position onto a specific portion of said film material located at said exposure station; and
    supplementary optical means for always directing the image of a data item located at said data reflection position to said viewfinder system, whereby content of and position relative to said frame of said data item are viewable in said viewfinder system.

2. The camera as claimed in claim 1, wherein said viewfinder system comprises a dormer window type construction including a dormer window, and said data reflection position is located between said viewfinder dormer window and a transparent plate having applied thereon a frame having dimensions corresponding to a photographable area of said film material.

3. The camera as claimed in claim 1, wherein said viewfinder system comprises a dormer window type construction, said data reflection position is located separately from said viewfinder system, and said supplementary optical system includes a mirror and a compensating lens for directing a focussed image of a data item at said data reflection position to said viewfinder system.

4. The camera as claimed in claim 1, wherein said viewfinder system comprises a silvered frame type construction, said data reflection position is located separately from said viewfinder system, and said supplementary optical system includes a supplementary mirror for directing the image of a data item at said data reflection position to said viewfinder system.

5. In a camera including an exposure system comprising a main focussing lens system and associated main shutter means actuable to effect exposure of film material at an exposure station to image-wise light reflected from a scene to be photographed and a viewfinder system to permit viewing of a scene to be photographed and having defined therein a frame which defines a photographable area and viewable simultaneously with a scene to be photographed, the improvement comprising:
    data specification means including at least one disk means which is rotatable to and settable in different angular positions and which has defined on peripheral portions of opposite sides thereof identical sets of data, identical items of data being carried on diametrically opposite portions of said disk means;
    externally actuable setting means actuable to move said data specification means to different settings in each of which an item of data on one side thereof is brought to a data projection position and said corresponding identical item of data on the opposite side thereof is brought to a data reflection position;
    light source actuable simultaneously with actuation of said main shutter means to illuminate a data item located at said data projection position;
    supplementary lens means for focussing the image of a data item illuminated by said light source onto a specific portion of film material located at said exposure station; and
    supplementary optical means for always directing the image of a data item located at said data reflection position to said viewfinder system, whereby content of and position relative to said frame of said data item are viewable in said viewfinder system.

* * * * *